(12) United States Patent
Sugliani et al.

(10) Patent No.: US 7,684,111 B2
(45) Date of Patent: Mar. 23, 2010

(54) COUNTER-PUMPED DISTRIBUTED RAMAN AMPLIFICATION IN WAVELENGTH DIVISION MULTIPLEX OPTICAL COMMUNICATION SYSTEMS

(75) Inventors: Simone Sugliani, Bologna (IT); Giovanni Sacchi, Milan (IT); Fabrizio DiPasquale, Pisa (IT)

(73) Assignee: Ericsson AB, Stockholm (SE)

( * ) Notice: Subject to any disclaimer, the term of this patent is extended or adjusted under 35 U.S.C. 154(b) by 523 days.

(21) Appl. No.: 10/554,193

(22) PCT Filed: Apr. 23, 2004

(86) PCT No.: PCT/EP2004/050595

§ 371 (c)(1), (2), (4) Date: Jul. 17, 2007

(87) PCT Pub. No.: WO2004/095738

PCT Pub. Date: Nov. 4, 2004

(65) Prior Publication Data

US 2007/0285764 A1 Dec. 13, 2007

(30) Foreign Application Priority Data

Apr. 24, 2003 (IT) ............................ FI2003A0117

(51) Int. Cl.
*H01S 3/00* (2006.01)
(52) U.S. Cl. .................... 359/334; 359/341.3
(58) Field of Classification Search ................ 359/334, 359/341.3; 385/11
See application file for complete search history.

(56) References Cited

U.S. PATENT DOCUMENTS

| | | | | |
|---|---|---|---|---|
| 6,611,369 | B2* | 8/2003 | Matsushita et al. | 359/334 |
| 2002/0097481 | A1 | 7/2002 | Du et al. | |
| 2003/0067952 | A1* | 4/2003 | Tsukiji et al. | 372/36 |
| 2004/0109230 | A1* | 6/2004 | Matsushita et al. | 359/341.3 |
| 2004/0130777 | A1* | 7/2004 | Islam | 359/334 |
| 2006/0109875 | A1* | 5/2006 | Matsushita et al. | 372/29.02 |

OTHER PUBLICATIONS

Optical Society of America/Institute of Electrical and Electronics Engineers, M. Eiselt, et al., *Raman Induced Cross Talk With PRBS Modulation*, Optical Fiber Communication Conference, (OFC), Postconference Digest, Atlanta, GA, Mar. 23-28, 2003, p. 334-335.

* cited by examiner

*Primary Examiner*—Mark Hellner
(74) *Attorney, Agent, or Firm*—Kirschstein, et al.

(57) ABSTRACT

A Raman pump module for generating pump radiation having a pump wavelength ($\lambda_p$) for coupling into a transmission fiber of an optical wavelength division multiplex (WDM) communication system to provide Raman amplification of WDM radiation counter propagating therethrough is disclosed. The pump module is for use in a communications system in which the WDM radiation has a transmission waveband ($\lambda_s$) and wherein the transmission fiber has a zero dispersion wavelength ($\lambda_m$) lying midway between the transmission waveband and the pump wavelength. The module comprises a Raman pump laser for generating the pump radiation and a de-correlator for de-correlating the longitudinal modes of the pump radiation before it is coupled into the transmission fiber.

19 Claims, 19 Drawing Sheets

COUNTER-PUMPED DISTRIBUTED RAMAN AMPLIFICATION IN WAVELENGTH DIVISION MULTIPLEX OPTICAL COMMUNICATION SYSTEMS

This invention relates to optical communications systems and in particular to a counter-pumped distributed Raman Amplification in Wavelength Division Multiplex WDM optical communications system. Moreover the invention provides a method of providing counter-pumped Raman amplification, an optical WDM communications system incorporating counter-pumped distributed Raman amplification and a Raman pump module.

WDM optical communications systems, a simplified diagram of which is shown in FIG. 1, make it possible to transmit a plurality N of communications channels along a single optical fibre (2). As is known a respective transmitter (4) TX1 to TXN modulates each communications channel/s onto a respective optical carrier having a respective carrier wavelength $\lambda 1$ to $\lambda N$. The optical carriers are often referred to as wavelength channels. The optical carrier modulated with the communications channel/s (optical signal), originating from the transmitters (4), are combined by a multiplexer (6) MUX to form WDM radiation which is optically amplified by a transmission power amplifier (8) and are caused to propagate along the fibre (2). The WDM radiation is optically amplified during transmission along the fibre (2) by an in-line optical amplifier (10) ILA to compensate for losses introduced by the fibre and by any other components included in the transmission path (e.g. chromatic dispersion compensators, equalising filters, etc.). At the destination node the WDM radiation is optically amplified by a receiver power optical amplifier (12) RPA before being separated into separate wavelength channels by a demultiplexer (14) DEMUX and directed to a corresponding receiver (16) RX1 to RXN.

The development of such communication systems is tending towards a continuous increase in their transmission capacity (i.e. a greater number of WDM wavelength channels, higher modulation frequency) and towards the possibility of covering increasingly greater distances without optical to electrical conversion. Raman amplification, and in particular distributed Raman amplification, plays a part in the development of WDM optical communication systems. While the optical amplifiers (8, 10, 12) indicated in FIG. 1 are discrete amplifiers, typically erbium-doped fibre amplifiers EDFA, and which include the amplifying medium (erbium doped optical fibre), distributed Raman amplifiers use the transmission fibre as the amplifying medium. A block diagram of a WDM system based on EDFA and distributed Raman amplification is shown in FIG. 2. Raman amplification is obtained by the transfer of optical power from a Raman pump RP laser (18) to the WDM optical signals as they propagate along the transmission fibre. Raman amplification can be achieved by pumping with radiation of the appropriate wavelength which propagates in the same direction as the WDM radiation, co-propagating, or using pump radiation which propagates in the opposite direction to the propagation of the WDM radiation, counter-propagating. Counter propagating amplification, hereinafter termed counter-pumped, is less problematical in terms of noise transferred by the pump to the WDM signals than a co-propagating scheme and is accordingly more typically used in present commercial systems. The pump radiation is coupled into the transmission fibre (2) by means of an optical coupler (20).

Since in a distributed Raman optical amplifier transfer of optical energy from the pump to the WDM radiation occurs within the transmission fibre the characteristics of the fibre affect the amplifier characteristics. There are various types of transmission fibres:

G652—also referred to as SFM, has a dispersion zero at approximately 1300 nm and dispersion of approximately 15 ps/km nm at 1550 nm (where c-band WDM channels are typically allocated because minimum attenuation of the silica fibre occurs at 1550 nm).

G653—also known as DSF (dispersion shifted fibre) has a dispersion zero at 1550 nm. Such fibre is poorly suited to WDM transmission at 1550 nm (c-band) because the low dispersion at 1550 nm increases non-linear interaction between the WDM channels.

G655—also referred to as NZ-DSF (non zero dispersion shifted fibre) does not have the dispersion zero in the band at 1550 nm nor at 1300 nm as in the case of G652. Among these mention may be made of the following:

TW-RS: with dispersion zero at 1450 nm (OFS)
TW-CLASSIC with dispersion zero at 1515 nm (OFS)
TW-PLUS with dispersion zero at 1530 nm (OFS)
E-LEAF with dispersion zero at 1500 nm (CORNING)
FREE-LIGHT with dispersion zero at 1500 nm (PIRELLI)

In the case of the silica transmission fibres used in current optical communications systems the maximum Raman gain occurs at a frequency difference of approximately 13 THz (100 nm) between the pump wavelength and the signal wavelength (with the pump at a lower wavelength than the signals).

Raman amplification improves the optical signal-to-noise ratio (OSNR) at the output from the system, makes it possible to reduce penalties due to non-linear propagation phenomena in the fibre and is therefore useful for increasing the transmission capacity of the system and the maximum distance which can be reached without resorting to optical to electrical to optical conversion.

Although less problematical than co-propagating Raman amplification, counter-pumped Raman amplification, under particular conditions and with particular transmission fibre characteristics, can give rise to serious penalties, most especially when an attempt is made to increase the power of the pump laser to provide greater optical gain in communication systems with very long connections between the transmit and receive sites. In general the problem of deterioration of the optical signal-to-noise ratio with counter-pumped Raman amplification occurs when the zero dispersion wavelength $\lambda_M$ of the fibre is located midway between the pump wavelength $\lambda_P$ and the signal wavelength $\lambda_S$, or in other words when the chromatic dispersion at the pump wavelength and at the signal wavelength is the same as an absolute value; under these conditions the ASE (amplified spontaneous emission)—beneath the signals travels with the same group velocity as the pump and therefore interacts effectively with the pump.

In practice WDM signals for communication systems using both discrete EDFA amplifiers and counter-pumped distributed Raman amplifiers can be allocated in the conventional EDFA band (from 1530 to 1560 nm) or in the EDFA wide band (from 1570 to 1600 nm.)

Given that the Raman pumps must be located approximately 100 nm lower in wavelength than the WDM channels, we have as a first approximation that the Raman pumps for systems using EDFA in the conventional band (1530-1560 nm) will lie within the range 1430-1460 nm, while in the case of systems with wide band EDFA (1570-1600 nm) the pumps will lie between 1470 nm and 1500 nm.

It is to be noted that, especially in the case of non-zero dispersion shifted fibres (NZ-DSF), the zero dispersion wavelength may lie between the pumping laser radiation and the conventional WDM signals.

In transmission fibres of the G655 type, the zero dispersion wavelength $\lambda_M$ for the fibre may in fact lie midway between the wavelength $\lambda_P$ of the pump and the wavelength $\lambda_S$ of WDM signals. Under such a resonant condition (i.e. $[\lambda_S-\lambda_P]/2=\lambda_M$) the pump is capable of transferring noise to the signals very effectively, despite the fact that the pump laser radiation is counter propagating, through different mechanisms which will be now be discussed.

The physical mechanisms underlying the transfer of noise from the pump radiation to the signals in the counter propagating situation are complex. It is necessary to bear in mind that in addition to amplifying the signals, Raman amplification also introduces amplified spontaneous emission (ASE) noise which propagates in both directions along the transmission fibre (ASE+ co-propagating with the WDM signals and ASE− counter propagating with respect to the WDM signals). In addition, distributed Raman amplification generates another major cause of noise associated with Rayleigh backscattering phenomena affecting both the signals and the ASE. The presence of non-linear interactions between the pump radiation and the amplified spontaneous emission co-propagating with respect to the pump (ASE−) and transfer of the pump's relative intensity noise (RIN) to the spontaneous emission further complicate the mechanism.

In summary, the phenomenon degrading distributed Raman amplifier performance under resonance conditions is associated with efficient non-linear parametric gain interaction between the pump radiation and the spontaneous emission propagating in the same direction as the pump (ASE−), due specifically to the resonance condition (parametric gain is a non-linear resonant four-wave-mixing interaction phenomenon). This ASE− is enormously amplified in the resonance zone, that is for wavelengths which are symmetrical with respect to the pump on the other side of the fibre's zero dispersion wavelength. The non-linear parametric gain interaction causes the ASE− to grow excessively in that spectral zone (bump) the higher the Raman gain and therefore the pump used; the ASE− travelling in the pump direction is backscattered and amplified again by the pump giving rise to the accumulation of co-propagating spontaneous ASE+ emission precisely in the spectral range of the signals, degrading their signal-to-noise ratio.

In addition to this there is another mechanism degrading performance under resonance conditions associated with double Rayleigh backscattering (DRS) of the signal, in which the individual backscattered signal propagates in the same direction as the pump and can therefore undergo parametric amplification in addition to Raman amplification. The double backscattering undergoes further Raman amplification and creates cross-talk for the signal.

These phenomena are particularly limiting when the pump laser used has a relatively narrow band (less than 1 nm) and is used at high power under resonance conditions. Also the pump laser's relative noise intensity (RIN) characteristics may affect this phenomenon, but to a lesser extent. Typical Fibre Raman laser, used for their high power and low cost, suffer seriously from the problems described. Even other types of pump sources, such as for example Fabry-Perot lasers, which are polarisation multiplexed (or depolarised), and characterised by a lower RIN, give rise to lesser penalties under resonance conditions but cannot provide such high gains as those which can be achieved using Fibre Raman lasers and which are required in WDM systems with long fibre lengths/losses.

It is an object of the present invention to provide a counter pumped Raman amplifier and method of providing counter propagating Raman amplification which at least in part overcomes the disadvantages and penalties due to the phenomena described above even under resonance conditions.

It is a further object to provide a method and system that will make it possible to achieve high Raman gain using high power/low cost Fibre Raman lasers.

In essence the invention comprises deliberately de-correlating the longitudinal modes of the pump radiation before injecting it into the transmission optical fibre in a counter propagating direction with respect with the WDM signals such as to introduce a phase shift between the longitudinal modes of the laser pump radiation which is sufficient to cancel out the resonance phenomena described above.

The magnitude of the de-correlation introduced into the pump laser radiation is limited to the minimum necessary to cancel out the amplification peak of the ASE− for wavelengths which are symmetrical with respect to the wavelength of the pump laser radiation on the opposite side of the dispersion zero in the transmission fibre and therefore also the spontaneous radiation of ASE+ as a result of the mechanisms described above.

According to the invention there is provided a method of providing counter-pumped Raman amplification in a wavelength division multiplex WDM optical communication system, the communication system including a transmission optical fibre for guiding WDM radiation having a transmission waveband and at least one Raman pump laser for generating pump radiation having a respective pump wavelength and wherein the transmission fibre has a zero dispersion wavelength lying midway between the transmission waveband and the pump wavelength, the method being characterised by de-correlating the longitudinal modes of the pump radiation before coupling the pump radiation into the transmission fibre in a counter propagating direction with respect to the WDM radiation. By providing sufficient de-correlation of the longitudinal modes of the pump radiation this substantially reduces deterioration of the optical signal-to-noise ratio of the WDM radiation during transmission.

Advantageously the method further comprises generating the pump radiation using a Fibre Raman laser. Such laser provide the benefit of high output powers for a relatively low cost compared to other types of laser.

According to a second aspect of the invention there is provided an optical wavelength division multiplex WDM communication system comprising a transmission optical fibre for guiding WDM radiation having a transmission waveband; at least one Raman pump laser for generating pump radiation having a respective pump wavelength and coupling means for coupling the pump radiation into the transmission optical fibre in counter propagating direction with respect to the direction of propagation of the WDM radiation and wherein the transmission fibre has a zero dispersion wavelength lying midway between the transmission waveband and the pump wavelength, the system being characterised by de-correlating means for de-correlating the longitudinal modes of the pump radiation before it is coupled into the transmission fibre.

Preferably the pump laser comprises a fibre Raman laser. Alternatively it can comprise a Fabry-Perot laser diode or other suitable laser sources.

Advantageously the de-correlating means includes a length of optical fibre having dispersive or non-linear characteristics for de-correlating the longitudinal modes of the pump radiation. In a preferred arrangement it comprise a length of dispersion compensating fibre (DCF). In a WDM system operating at 1550 nm the DCF is of a length to produce, for example, a total dispersion whose absolute value lies between 20 ps/nm and 250 ps/nm For example it can comprise a 100 km length of TW-RS fibre. The dispersive or non-linear characteristic has an effective are $A_{\mathit{eff}}$ and non linear coefficient γ to produce sufficient de-correlation of the modes of the pump radiation to reduce or prevent deterioration in the WDM radiation.

Advantageously when the de-correlating element includes a length of optical fibre for de-correlating the modes communication system advantageously further comprises a filter between the length of fibre and the coupling means for blocking spontaneous emission produced by the Raman effect in the length of fibre.

Alternatively the de-correlating means can comprises a first optical coupler for dividing the pump radiation to propagate along first and second optical paths; a delay element included within one of the optical paths; and second coupling means for re-combining the pump radiation from the first and second optical paths.

Preferably in such an arrangement the delay element comprises a length of optical fibre whose length is sufficient to de-correlate the longitudinal modes of the pump radiation.

In a further alternative arrangement the de-correlating element comprises a polarisation divider for dividing the pump radiation to propagate along first and second optical paths; a delay element included within one of the optical paths; and a polarisation combiner for re-combining the pump radiation from the first and second optical paths.

Advantageously the delay element comprises a length of optical fibre whose length is sufficient to de-correlate the longitudinal modes of the pump radiation.

In a preferred arrangement the communication system further comprises a plurality of Raman pump lasers each for generating pump radiation having a respective different pump wavelength; a respective de-correlating means for de-correlating the longitudinal modes of the pump radiation; and multiplexing means for combining the pump radiation.

In accordance with a yet further aspect of the invention there is provided a Raman pump module for generating pump radiation having a pump wavelength for coupling into a transmission fibre of an optical wavelength division multiplex WDM communication system to provide Raman amplification of WDM radiation counter propagating there through, the WDM radiation having a transmission waveband; and wherein the transmission fibre has a zero dispersion wavelength lying midway between the transmission waveband and the pump wavelength, the module comprising a Raman pump laser for generating the pump radiation, characterised by de-correlating means for de-correlating the longitudinal modes of the pump radiation before it is coupled into the transmission fibre.

Advantageously the Raman module is further characterised by the pump laser being a fibre Raman laser.

In one arrangement the de-correlating means includes a length of optical fibre having dispersive or non-linear characteristics for de-correlating the longitudinal modes of the pump radiation. Advantageously the Raman module further comprising a filter between for blocking spontaneous emission produced by the Raman effect in the length of fibre.

Alternatively the de-correlating means can comprises a first optical coupler for dividing the pump radiation to propagate along first and second optical paths; a delay element included within one of the optical paths; and second coupling means for re-combining the pump radiation from the first and second optical paths. Preferably the delay element comprises a length of optical fibre whose length is sufficient to de-correlate the longitudinal modes of the pump radiation.

In a further alternative embodiment the de-correlating element comprises a polarisation divider for dividing the pump radiation to propagate along first and second optical paths; a delay element included within one of the optical paths; and a polarisation combiner for re-combining the pump radiation from the first and second optical paths. Again the delay element conveniently comprises a length of optical fibre whose length is sufficient to de-correlate the longitudinal modes of the pump radiation.

Various aspects and advantages of the invention will now be described by way the following description of some non-restrictive embodiments with reference to the appended drawings, in which.

Figure 1:
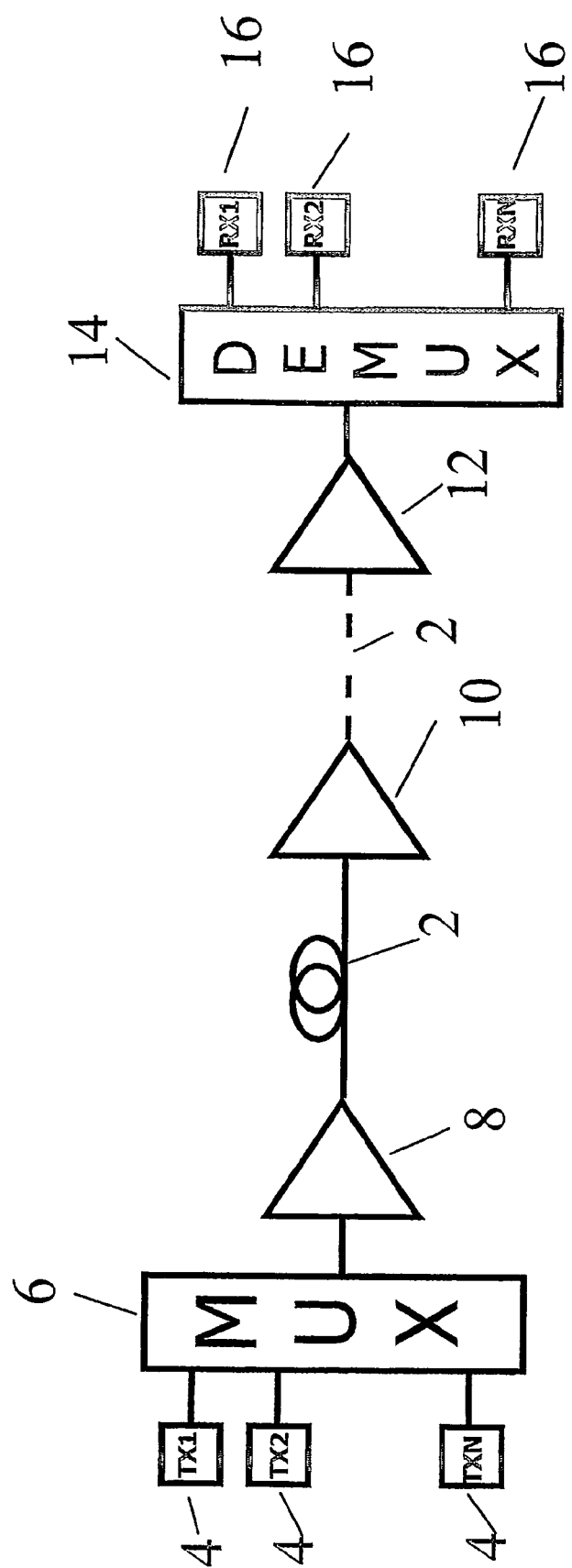
FIG. 1 is a diagrammatic representation of a WDM optical communications system according to the known art as hereinbefore discussed.
Figure 2:
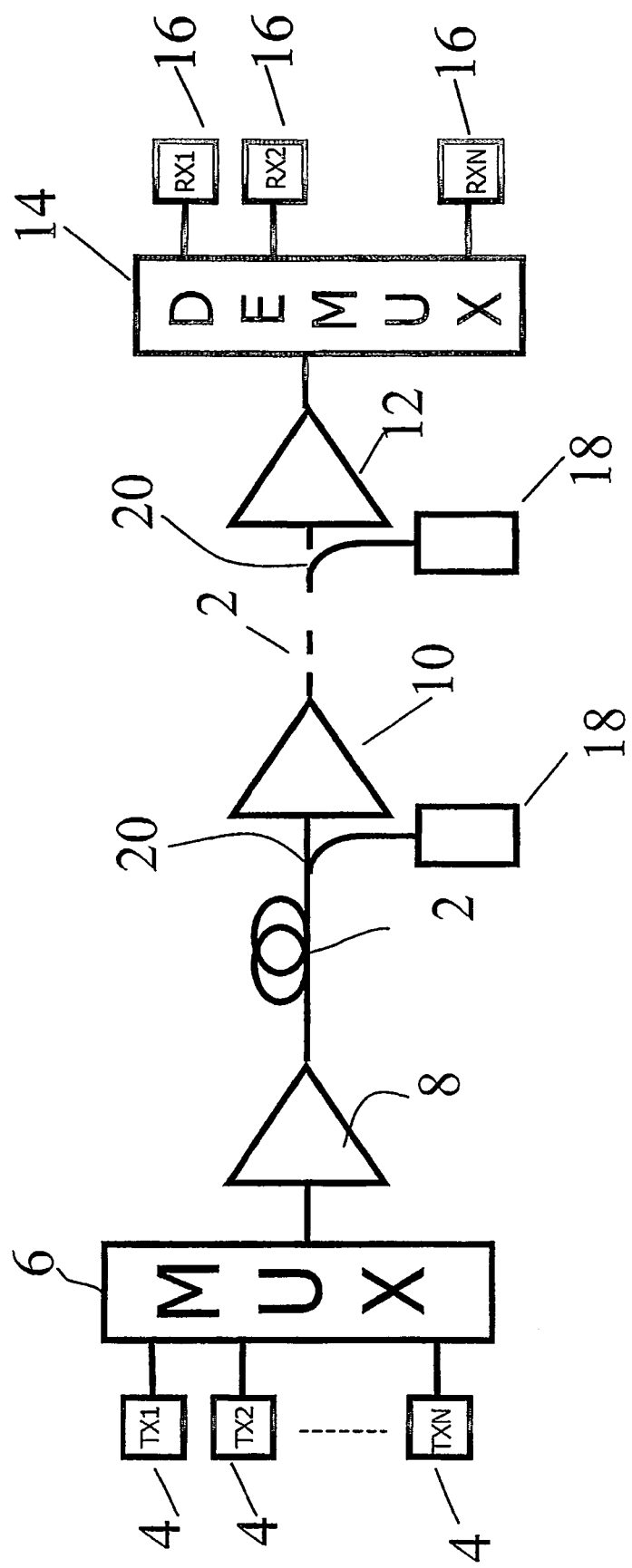
FIG. 2 is a diagrammatic representation of a WDM optical communications system including counter-pumped distributed Raman amplifiers according to the known art as hereinbefore discussed.
Figure 3:
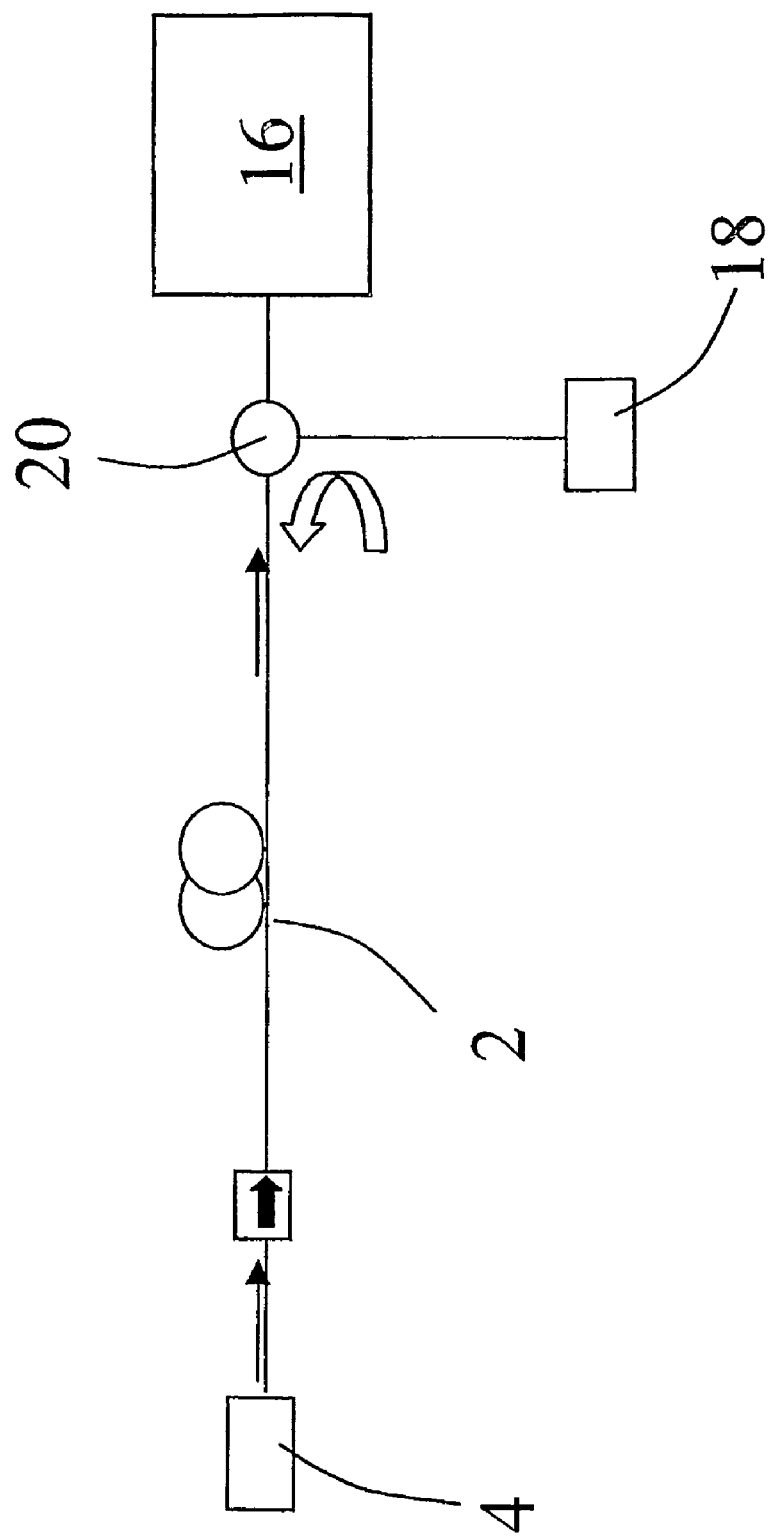
FIG. 3 illustrates a known arrangement for a counter-pumped Raman amplification using a Fibre Raman laser.
Figure 10:
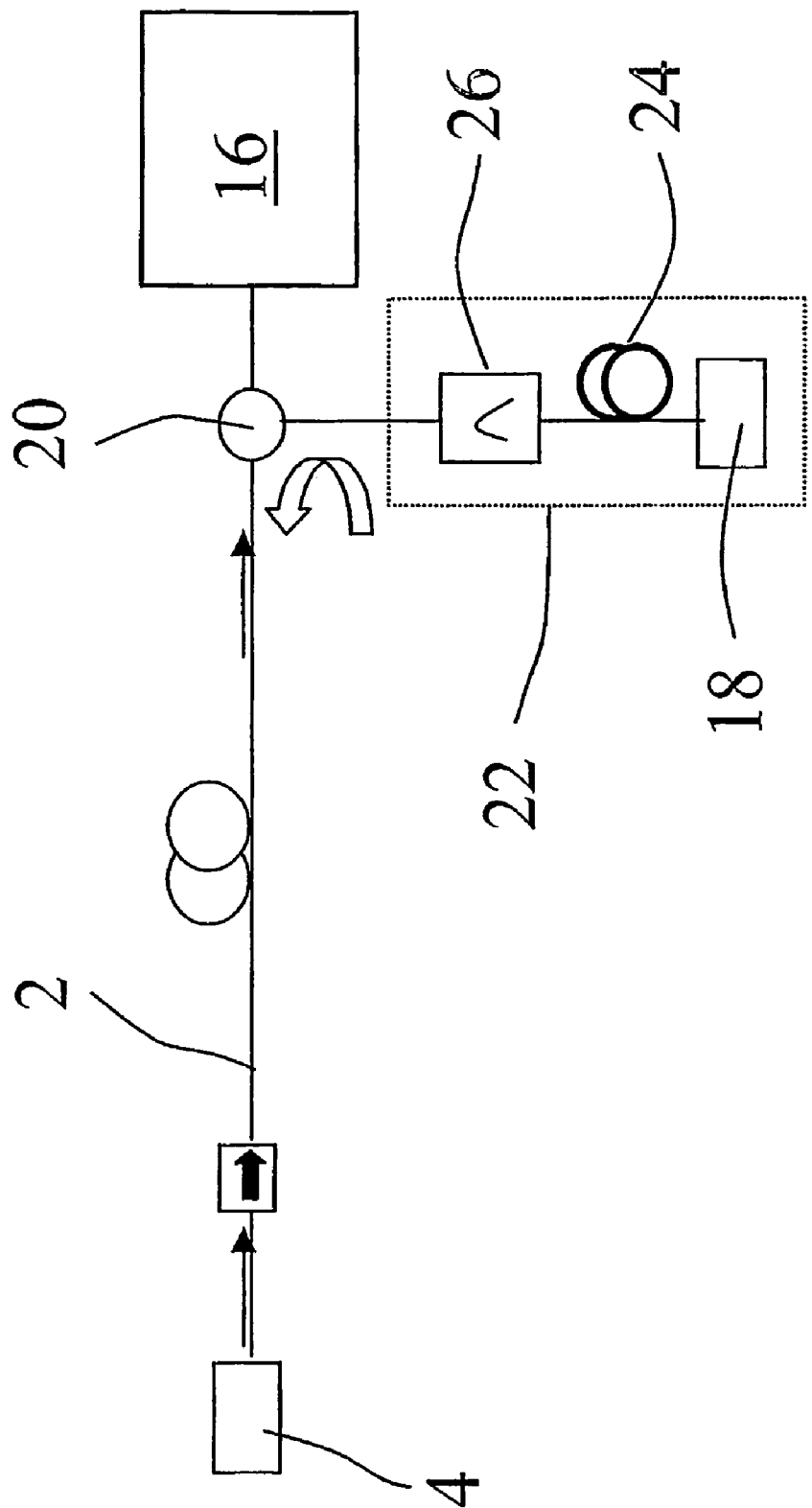
Figure 11:
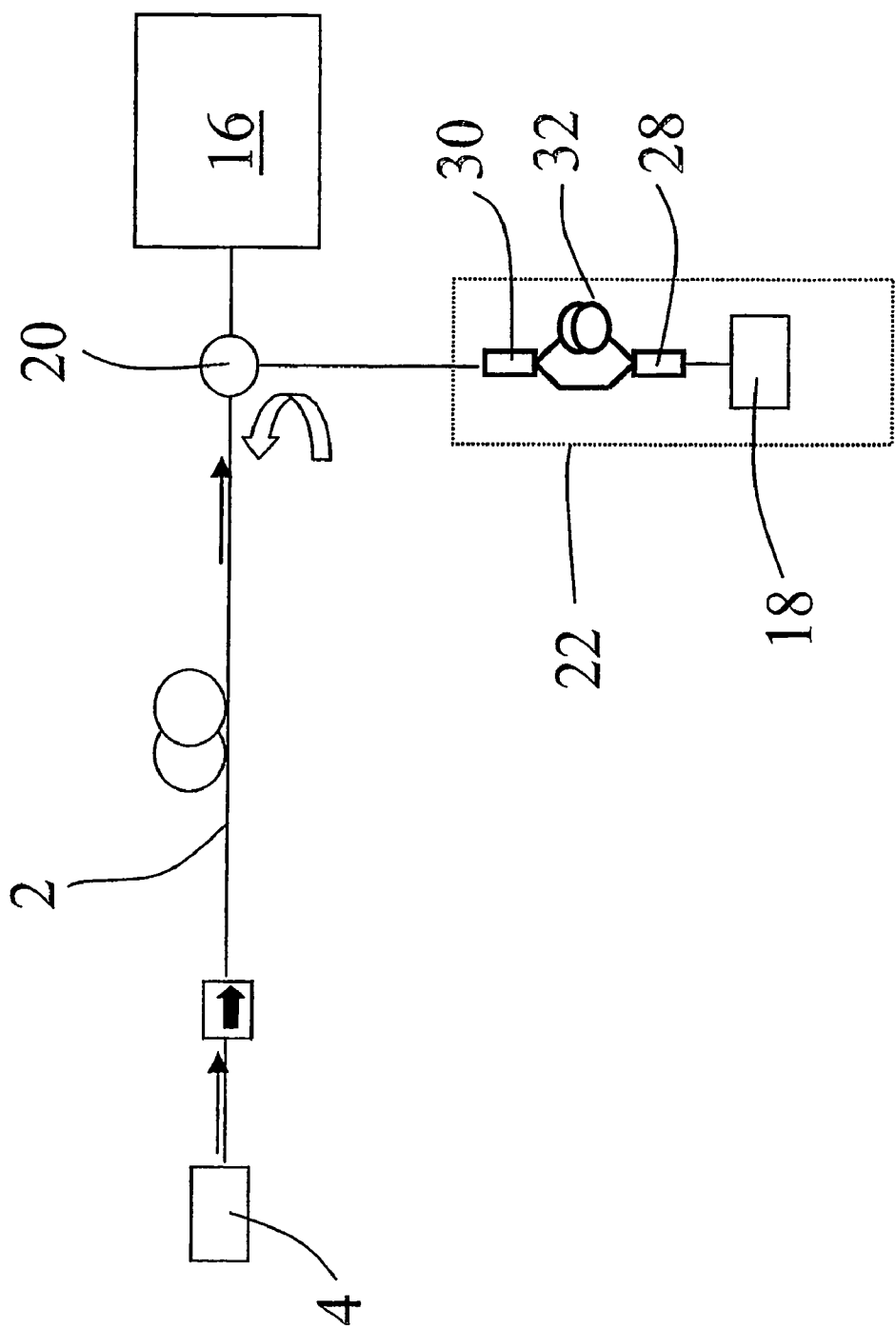
Figure 12:
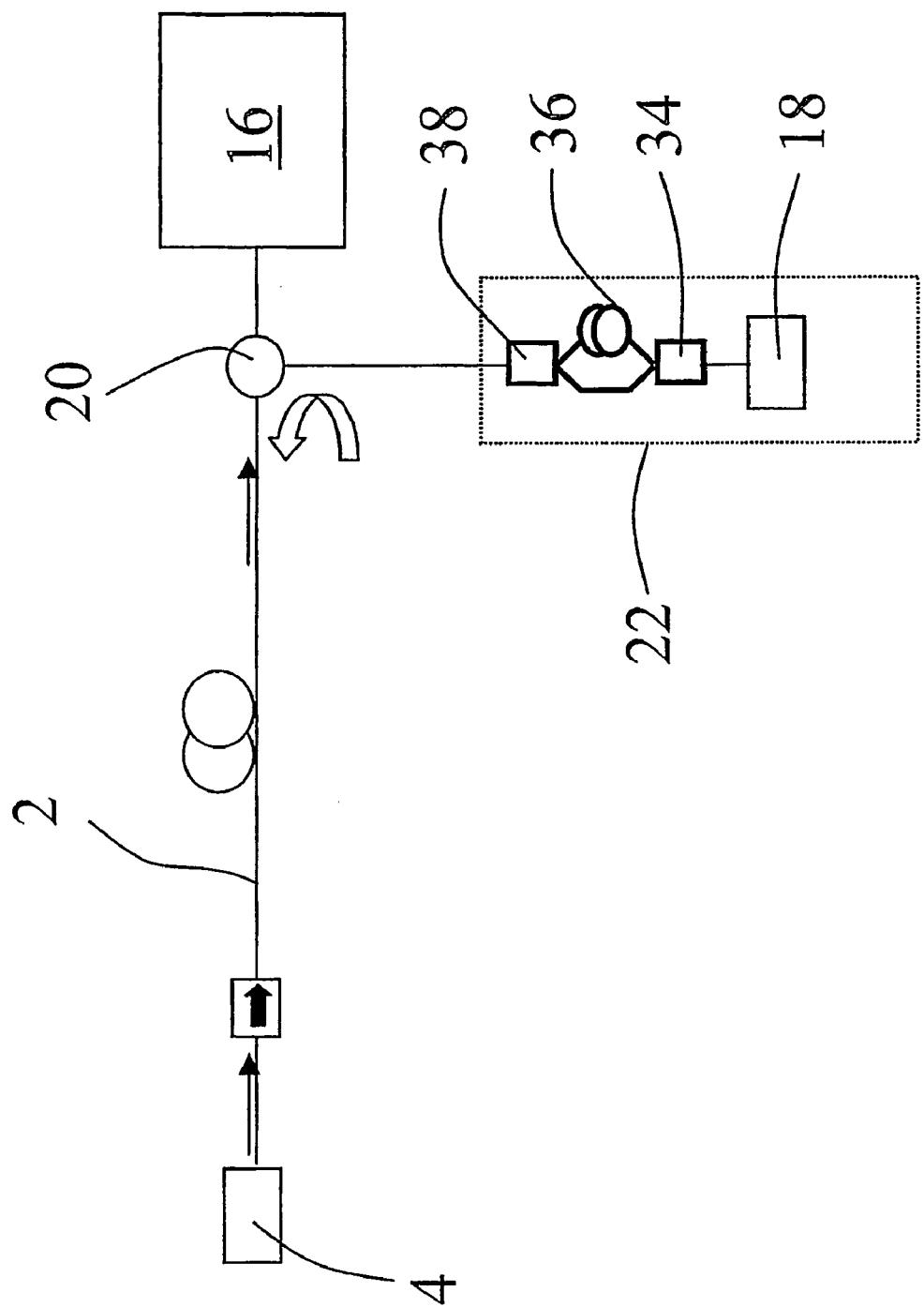
Figure 13:
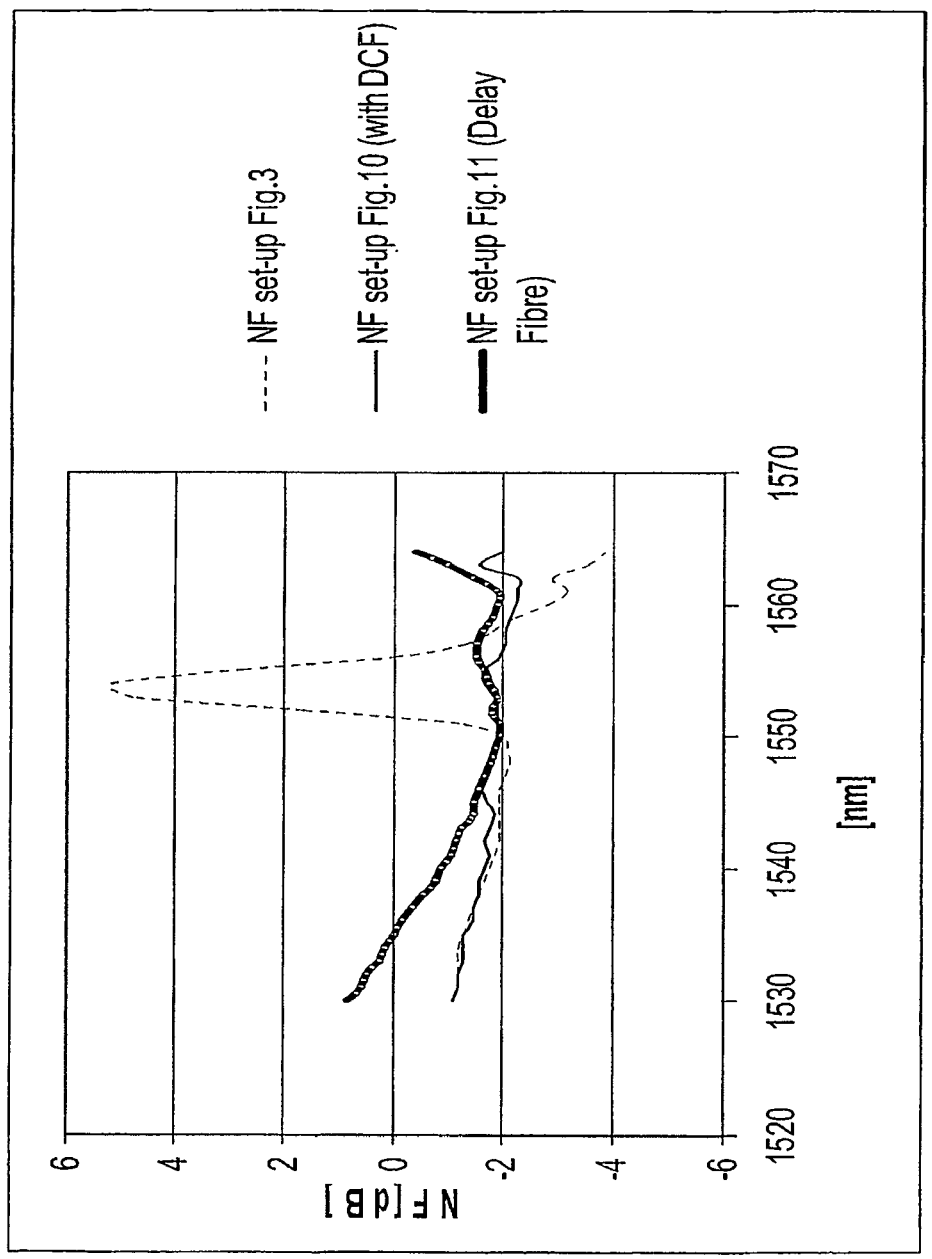
Figure 14:
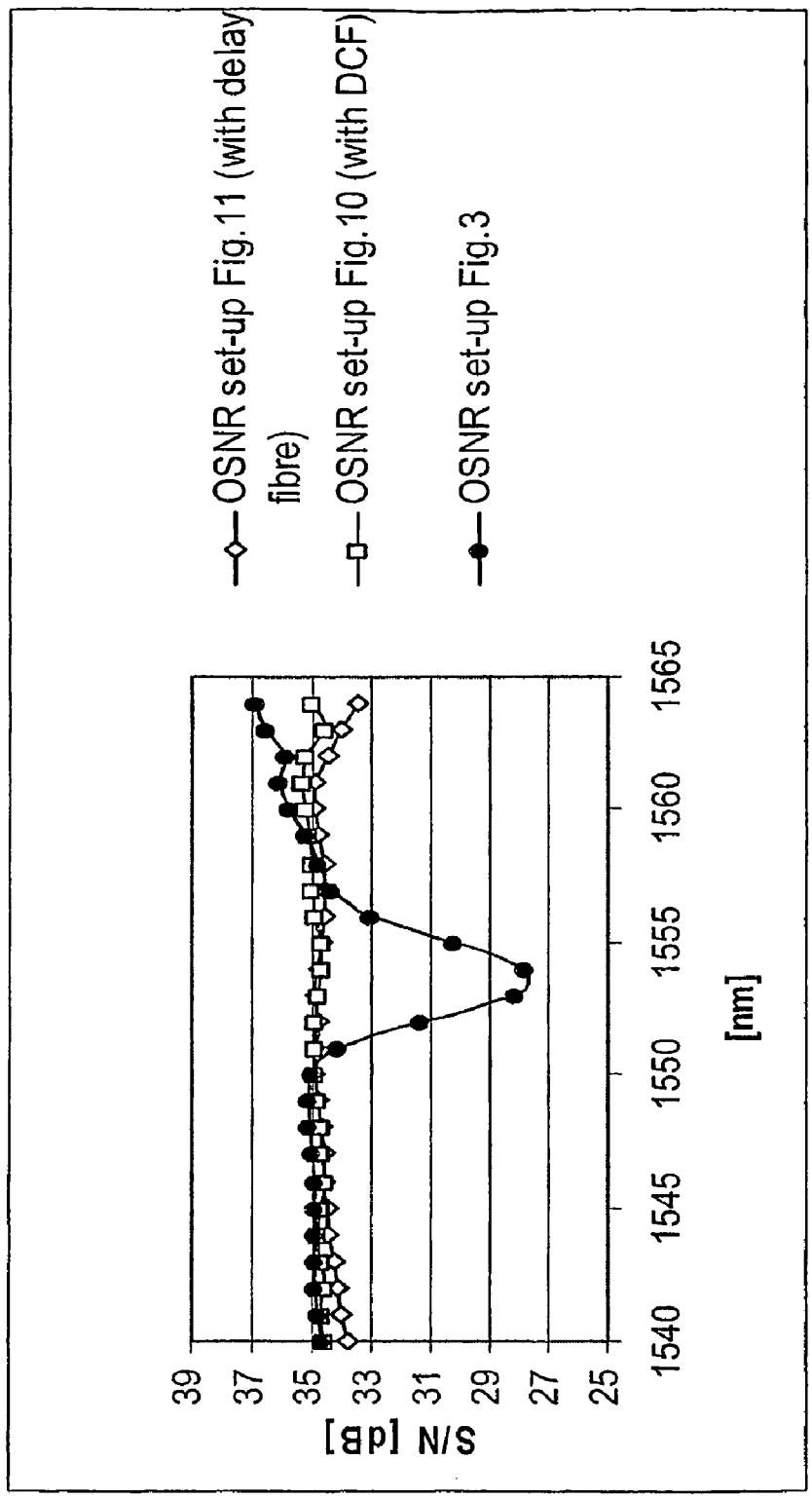
Figure 15:
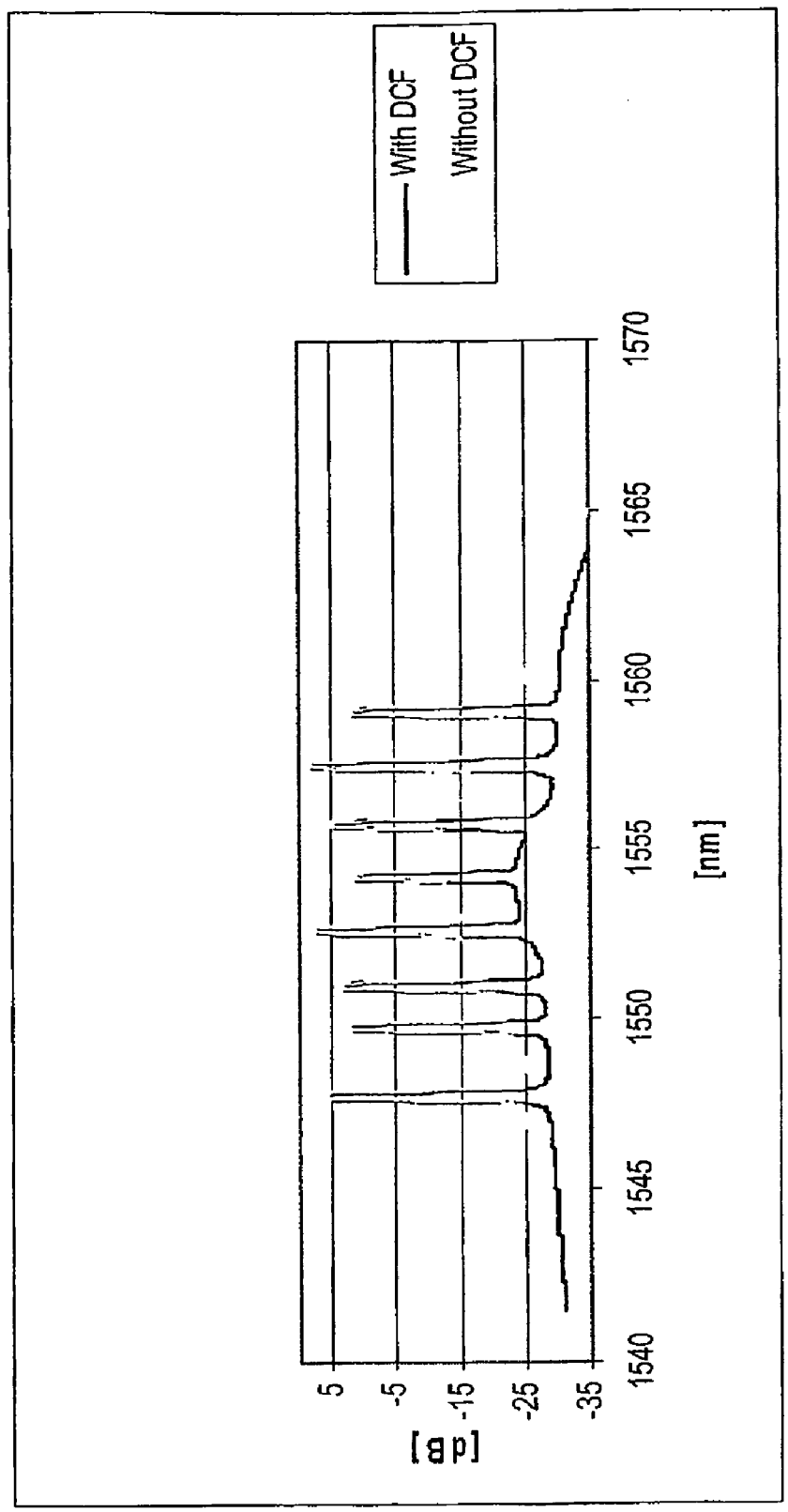
Figure 16:
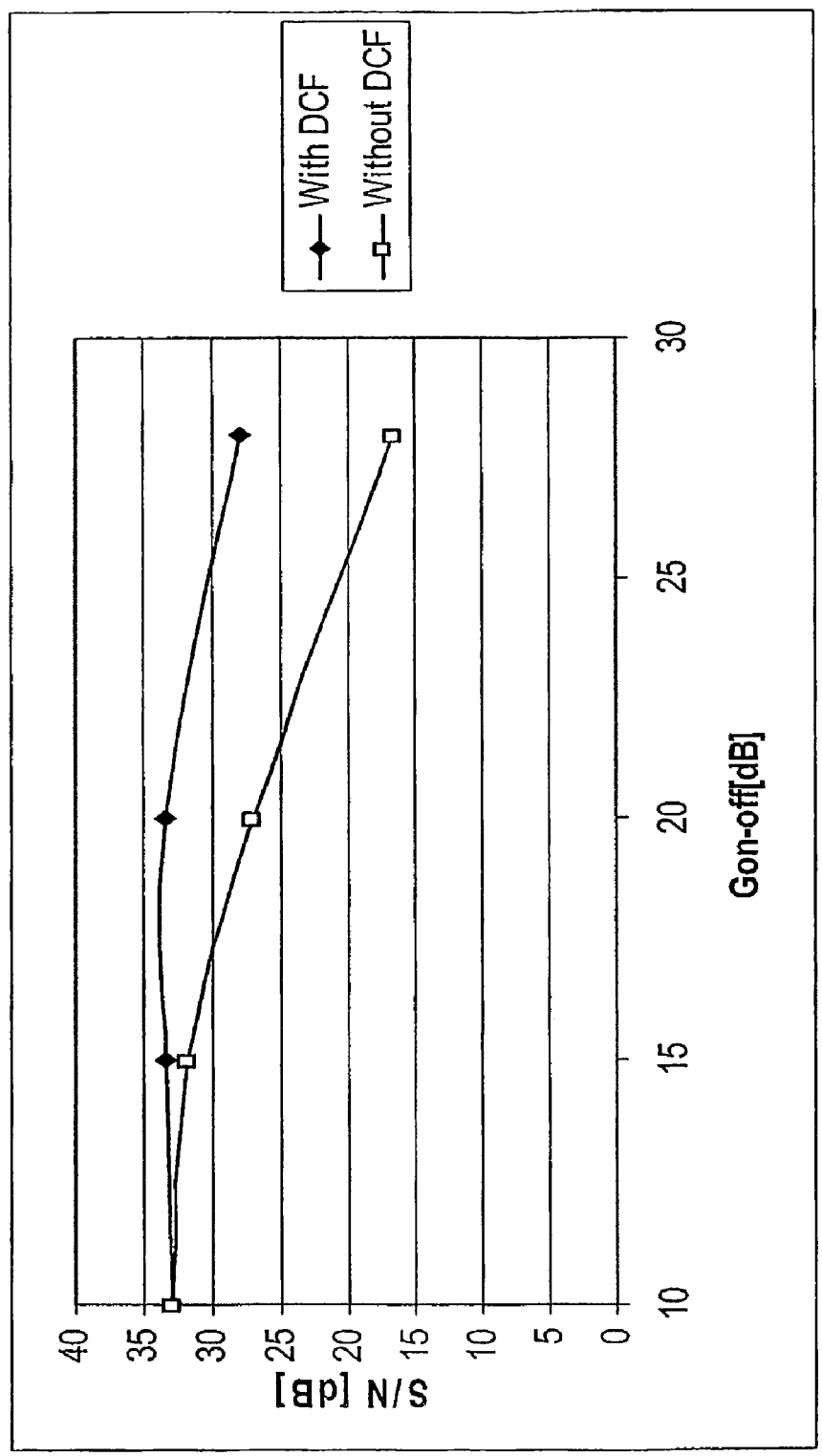
Figure 17:
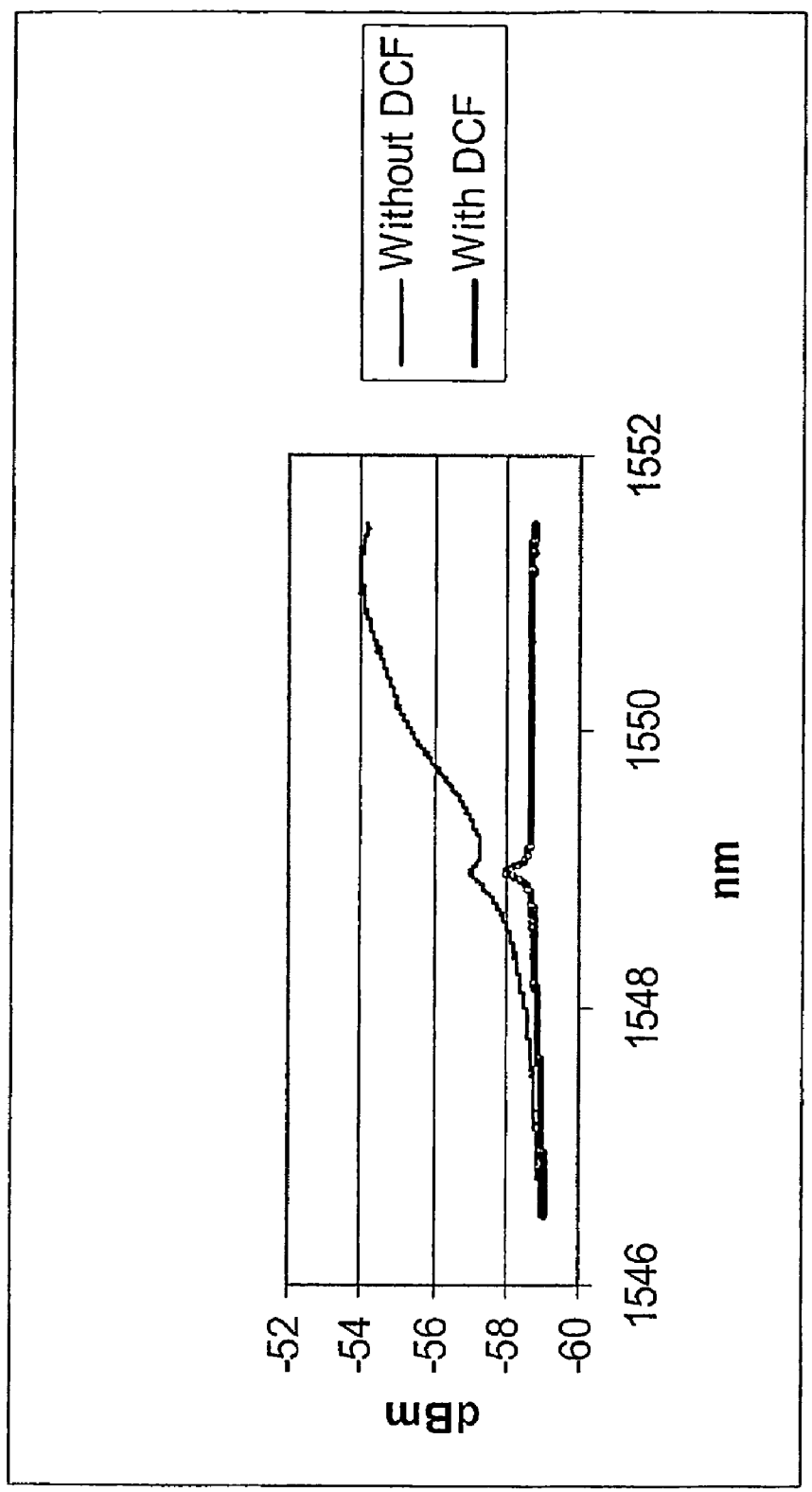
Figure 18:
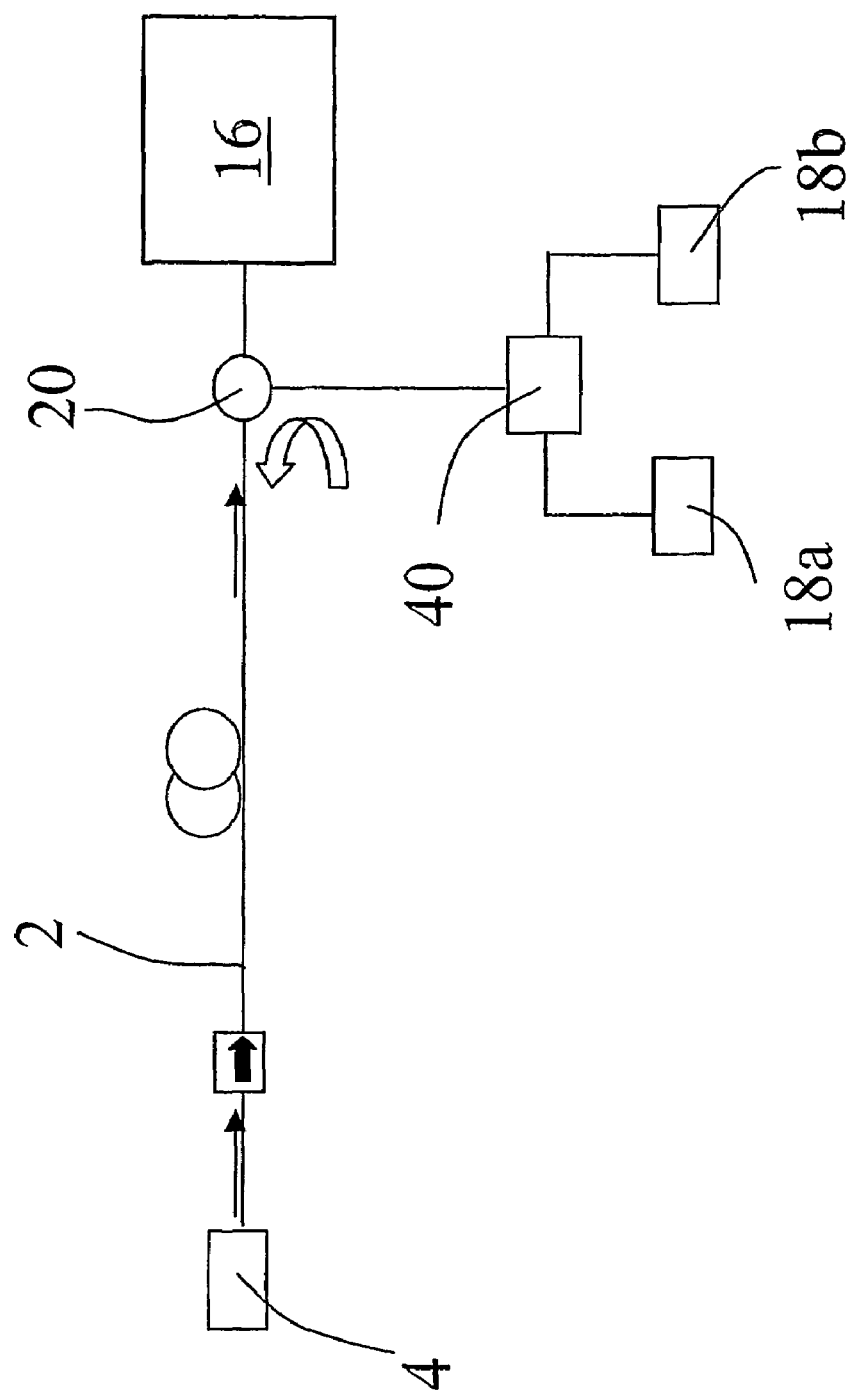
Figure 19:
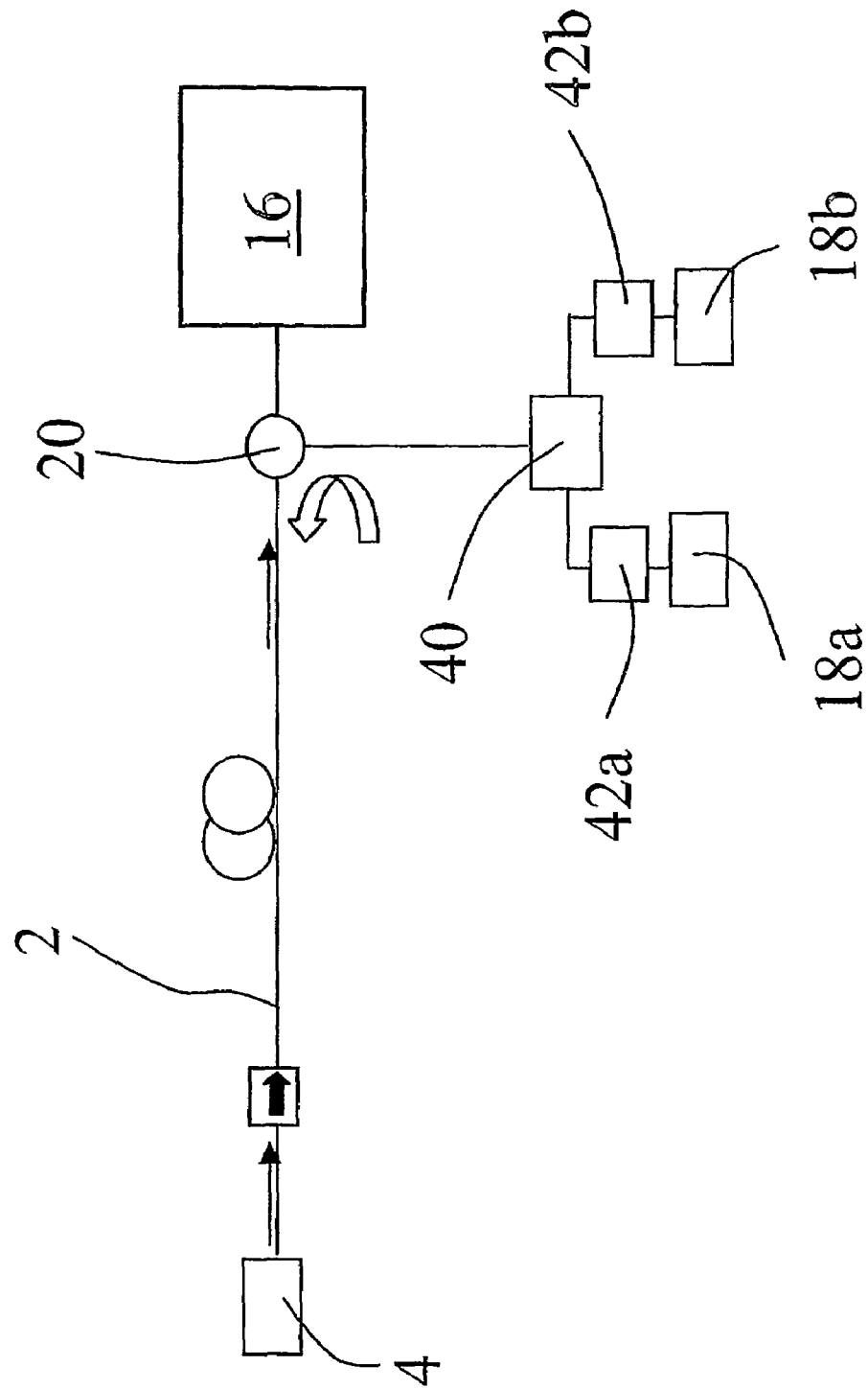

FIG. 10 diagrammatically illustrates a counter-pumped Raman amplification system according to a first embodiment of the invention;

FIG. 11 diagrammatically illustrates a counter-pumped Raman amplification system according to a second embodiment of the invention;

FIG. 12 diagrammatically illustrates a counter-pumped Raman amplification system according to a third embodiment of the invention;

FIG. 13 are plots of noise figure (NF) versus wavelength for the systems illustrated in FIG. 3 (known art) and FIGS. 10 and 11;

FIG. 14 are plots of optical signal-to-noise ratio (OSNR) versus wavelength for the systems illustrated in FIG. 3 (known art) and FIGS. 10 and 11;

FIG. 15 is the output spectra for the system shown in FIG. 3 (known art) and according to the invention as shown in FIG. 10 with eight input WDM wavelength channels;

FIG. 16 are plots of signal-to-noise ratio (S/N) versus on-off gain ($G_{on\text{-}off}$) for the system according to FIG. 3 (known art) and that according to the invention illustrated in FIG. 10;

FIG. 17 graphically shows a comparison between the ASE+ and DRS spectra for the system according to FIG. 3 (known art) and that according to the invention illustrated in FIG. 10;

FIG. 18 is a diagrammatic representation of a known counter-pumped Raman amplification having two pump lasers; and FIG. 19 is diagrammatic representation of a counter-pumped Raman amplification having two pump lasers in accordance with the invention.

For a better understanding of the invention it is first useful to examine an optical communication system in greater detail and identify its special features and problems. Referring to FIG. 3 there is shown a general diagram of a known counter-pumped distributed Raman amplifier arrangement. As is known in a counter-pumped Raman amplifier the WDM radiation and pump radiation propagate along the transmission fibre in opposite (counter propagating) directions. The pump radiation, which is of a wavelength/s that is/are lower (typically of the order of 100 nm lower) than that of the WDM radiation it is intended to amplify, can comprise a single wavelength or several wavelengths generated by a respective laser that are multiplexed together. The latter provides a wider gain bandwidth.

By way of example, we will consider below the most critical case of Raman pumping using a single wavelength pump which is generated using a Fibre Raman laser (18). As already mentioned, such pump sources provide a high output power (but at different W), are characterised by line widths of less than 1 nm and relative intensity noise (RIN) typically of the order of −110 dB/Hz. The spectrum of such sources comprises very many longitudinal modes, with a very narrow band (typically hundreds of kHz) and a separation typically of the order of MHz. The pump radiation has a low level of polarisation (less than 10%) and is coupled in the transmission fibre (2) through an optical circulator or through an optical coupler (20).

Figure 4:
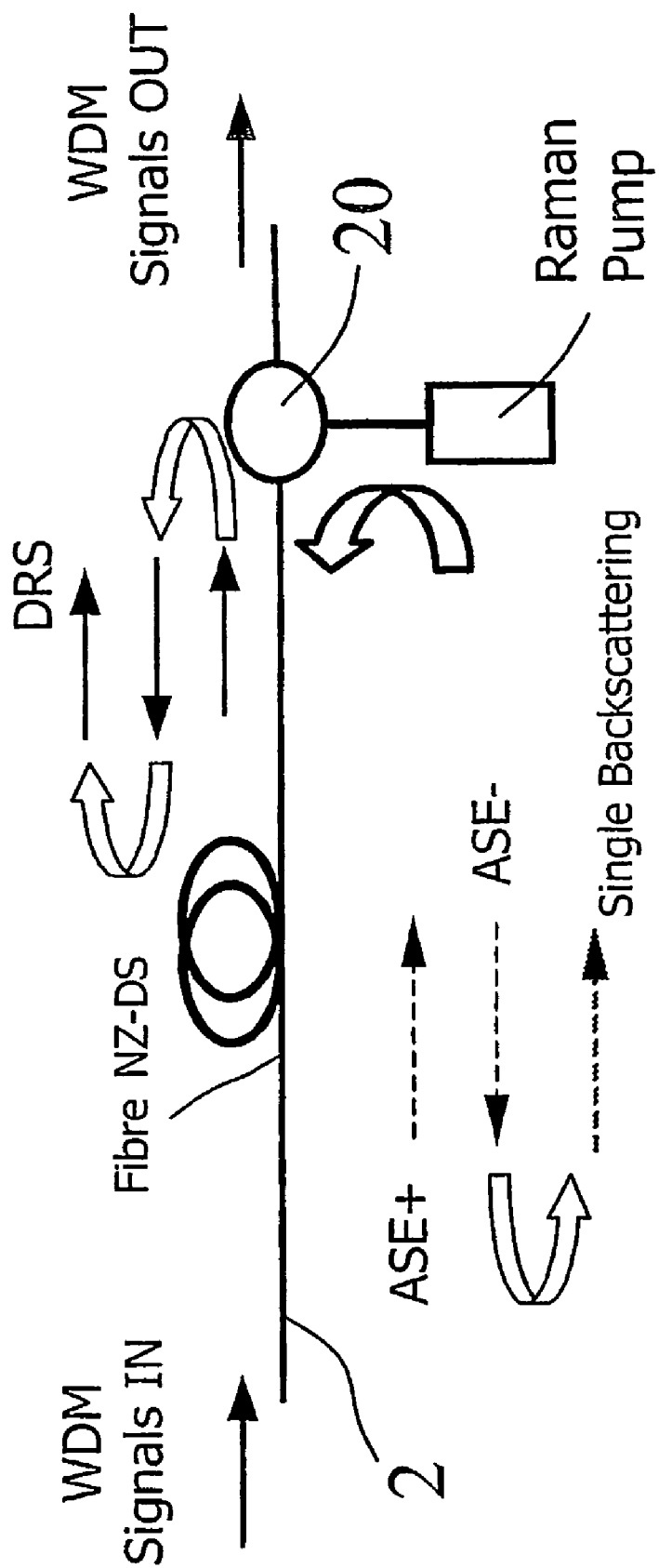
FIG. 4 shows diagrammatically the directions of propagation of signal radiation, pump radiation, ASE+, ASE−, single Rayleigh backscattered and double Rayleigh backscattered signal radiation in a counter-pumped Raman amplifier.

FIG. 4 diagrammatically illustrates the directions of propagation of the pump radiation, the WDM signals, ASE+ (amplified spontaneous emission which co-propagates with the WDM signals), ASE− (amplified spontaneous emission which counter propagates with respect to the WDM signals and the radiation due to the single Rayleigh backscattering of the ASE− and double Rayleigh backscattering (DRS) of the WDM signals. Let us consider a Fibre Raman laser (Keopsys) having a single wavelength (1443 nm) for counter pumping of the WDM signals in the conventional EDFA band using the distributed Raman amplifier arrangement illustrated FIG. 3. The transmission fibre (2) is of the G.655 (Pirelli Free-Light) type with zero chromatic dispersion at approximately 1500 nm. The resonance condition is therefore expected at wavelengths centred around 1558 nm.

Figure 5:
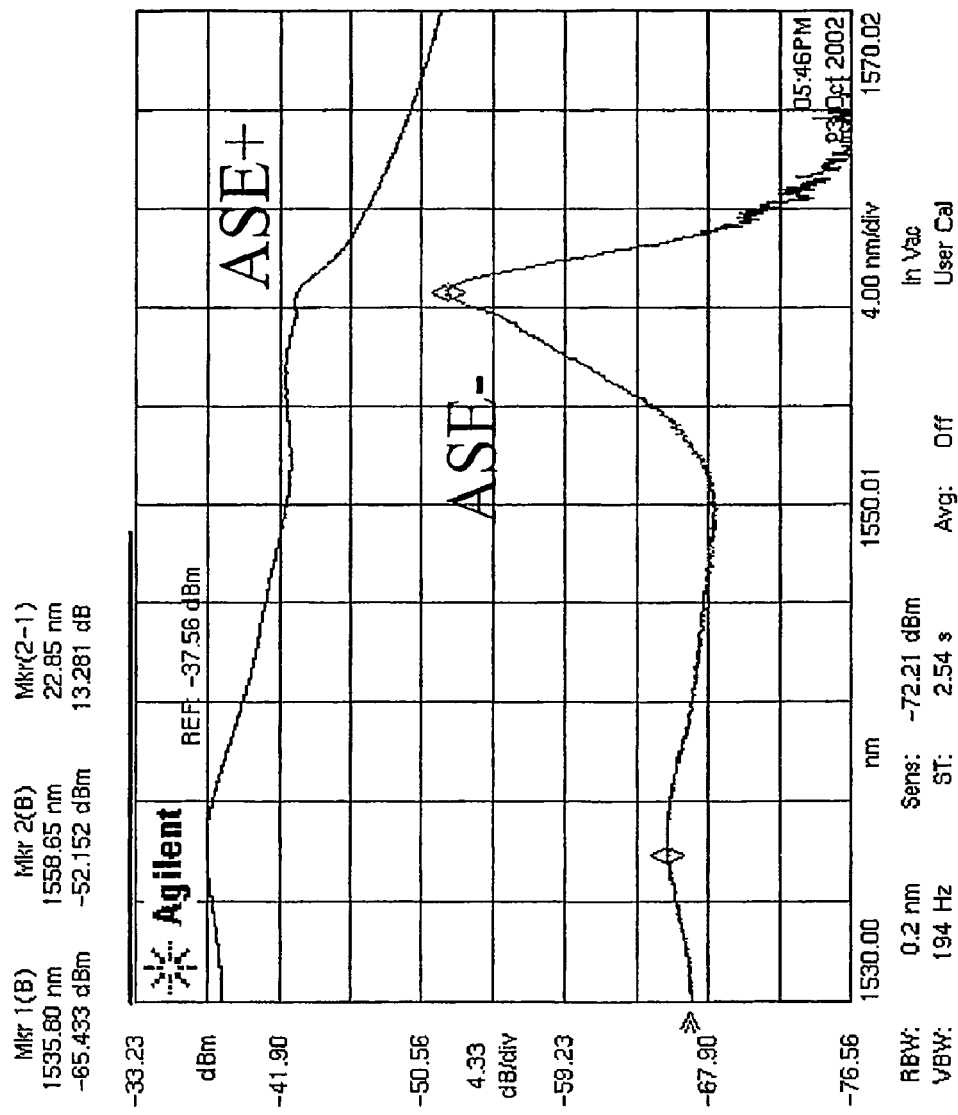
FIG. 5 are ASE− and ASE+ spectra for a pump power of 500 mW using a "Keopsys" laser.

The spectral characteristics of the ASE− and ASE+ generated in the transmission fibre of such a system have been investigated using an optical spectrum analyser. FIG. 5 compares the ASE− and ASE+ spectra at a particular pump power (500 mW). Note that the ASE+ is measured at the output from the transmission fibre and the ASE− at the input of the transmission fibre. Referring to FIG. 5 it is clear that there is an accumulation of spontaneous ASE− corresponding to the resonance. Less obvious, but never the less present, is the effect of this excessive spontaneous accumulation in the ASE+. This is due to the fact that the excessive accumulation of ASE− in the resonance zone is generated from the direct interaction of this spontaneous emission with the pump radiation; the increase in ASE+ around the resonance is instead due to backscattering and further amplification of the ASE−, a phenomenon which becomes increasingly obvious as the Raman gain is increased.

Figure 6:
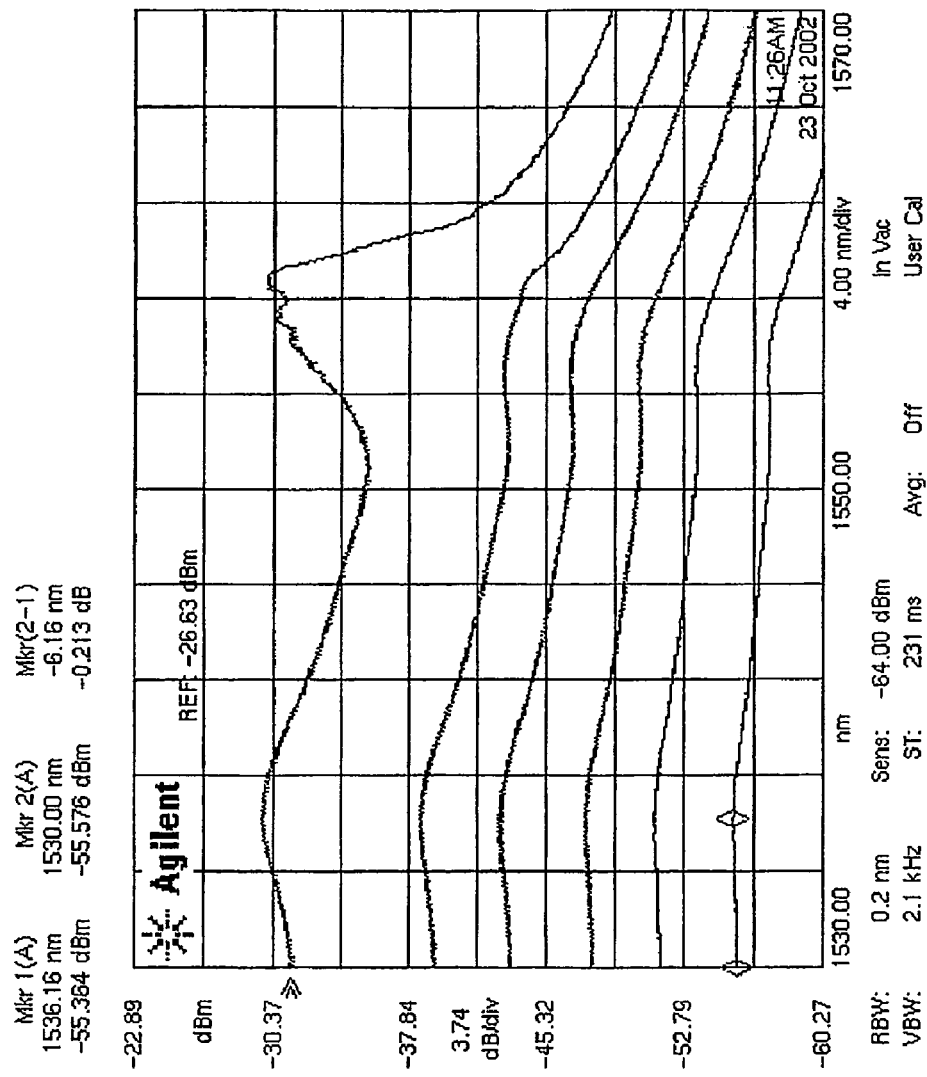
FIG. 6 are ASE+ spectra at the output from the transmission fibre for different pump powers using a "Keopsys" laser.

FIG. 6 shows the ASE+ spectra as the power of the coupled pump in the fibre is increased. From this Figure it will be apparent that the accumulation of ASE+ corresponding to the resonance appreciably increases with pump power and therefore with the Raman gain.

Figure 7:
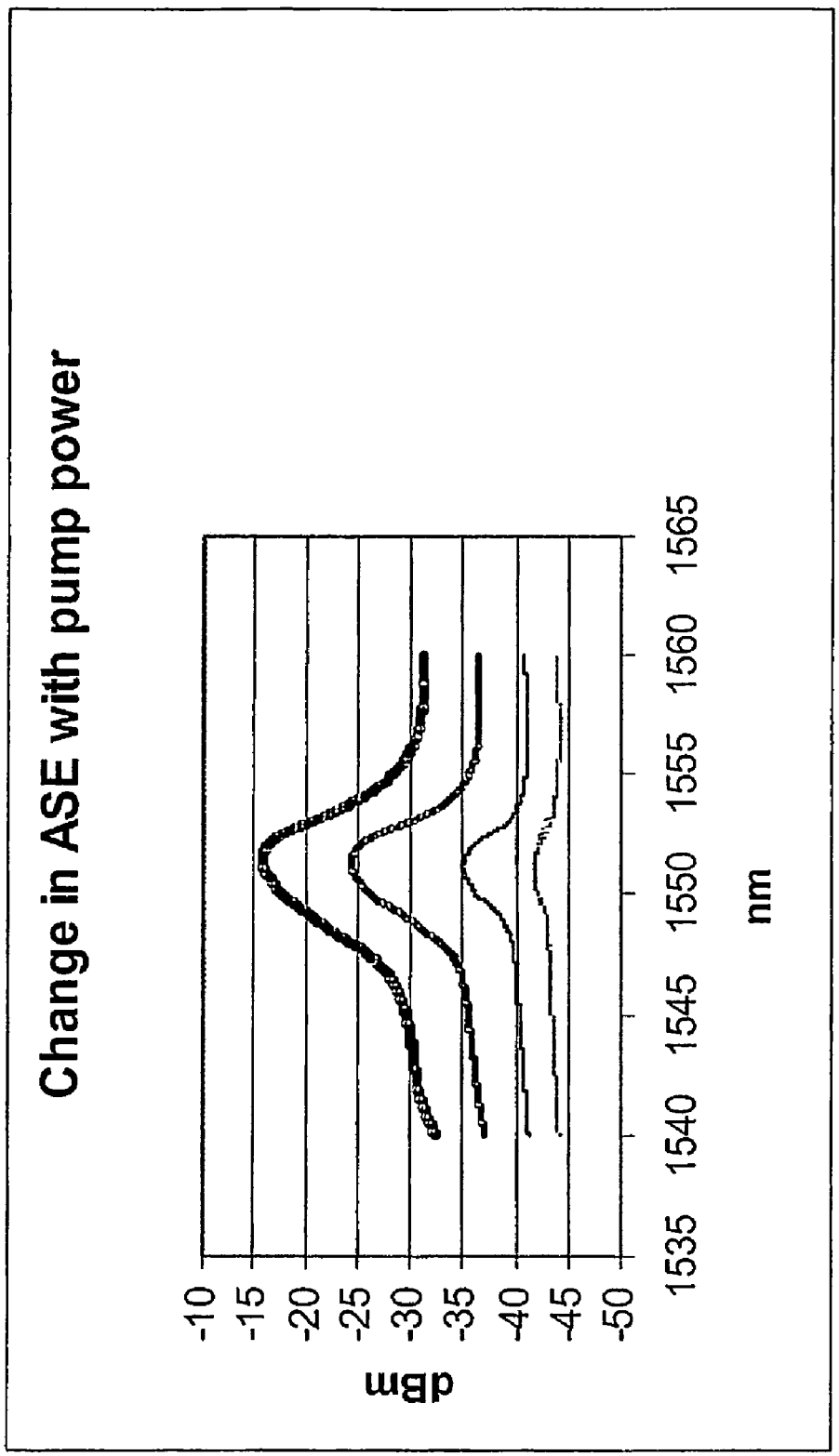
FIG. 7 are ASE+ spectra at the output from the transmission fibre for different pump powers for an IPG "Fibretech" laser.

The experiment was repeated with a fibre Raman laser from another supplier (IPG Fibertech) with an emission wavelength of 1450 nm. In this case, as illustrated in FIG. 7, the ASE+ spectrum shows an increasing accumulation (bump) around 1550 nm as the pump power increases.

The penalty induced in an optical communications system by a phenomenon of this type can be clearly shown by analysing the equivalent noise figure (NF) for the distributed Raman amplifier, which is defined by:

$$NF = 10\log\left(\frac{SNR_{in}}{SNR_{out}}\right) = 10\log\left(\frac{P_{ASE+}}{h\nu\Delta\nu G_{on-off}}\right)$$

Where $SNR_{in}$ and $SNR_{out}$ are the optical signal-to-noise ratio at the amplifier input and output, $P_{ASE+}$ is the power of the ASE+ at the output in a frequency band $\Delta\nu$, h is Plank's constant, $\nu$ is the signal frequency and $G_{on-off}$ is the on-off gain of the Raman amplifier which is defined as the ratio between the power of the output signal when the pump is on and the power of the output signal when the pump is off (note that the net gain physically used in concentrated amplifiers is defined as the ratio between the output power and the input power of the signal). The NF for a distributed Raman amplifier may be negative and the amplifier is better in terms of noise characteristics the lower the NF.

Figure 8:
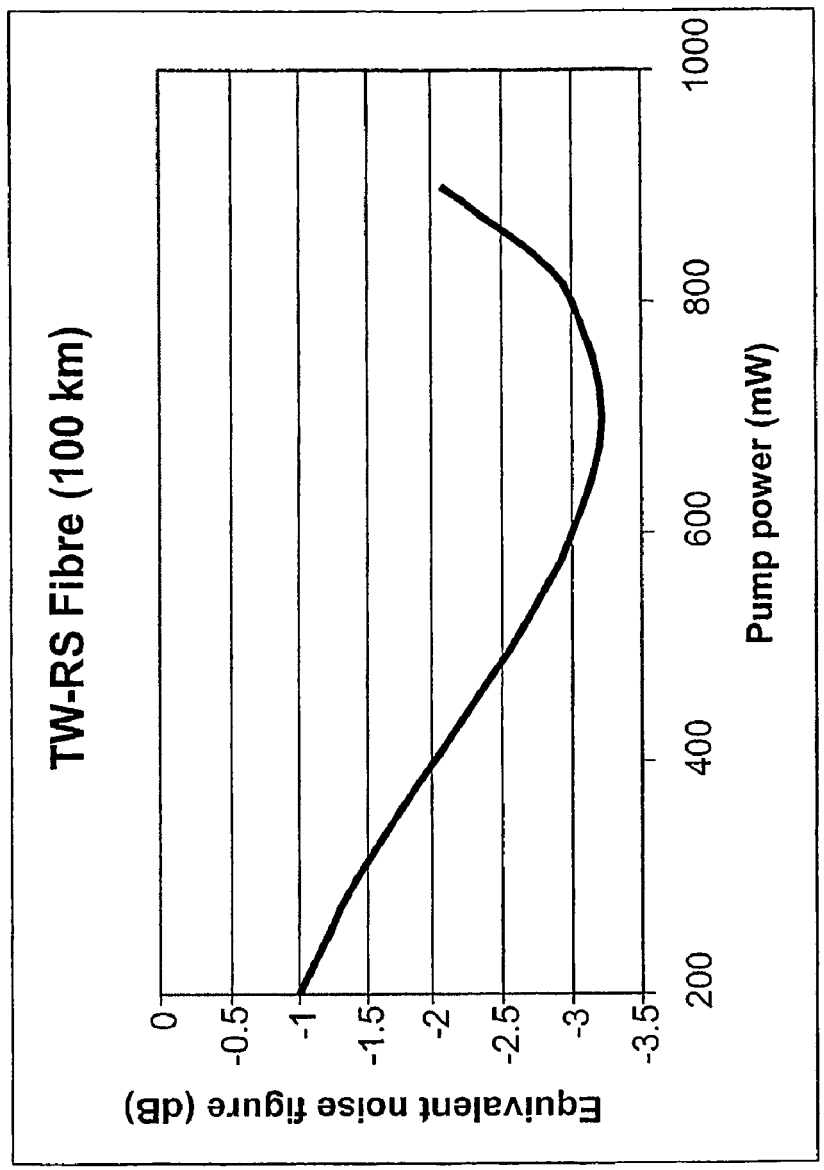
FIG. 8 is a plot of equivalent noise figure (NP) versus pump power.

Analysing the NF of a counter-pumped distributed Raman amplifier in relation to the pump power injected into the fibre (or the Raman gain), the typical curve shown in FIG. 8 is obtained. FIG. 8 illustrates results for 100 km of TW-RS optical fibre. The NF decreases as the pump power increases up to an optimum value above which it begins to rise again as a result of ASE− backscattering phenomena which when amplified again add together to the ASE+, increasing it and thus degrading the amplifier NP. This effect occurs regardless of the presence of resonance conditions and is intrinsic to counter-pumped distributed Raman amplification. Obviously the power value at which the increase in NF begins to be noted varies from fibre to fibre and in particular depends on the Rayleigh backscattering coefficient and the effective area of the fibre.

Figure 9:
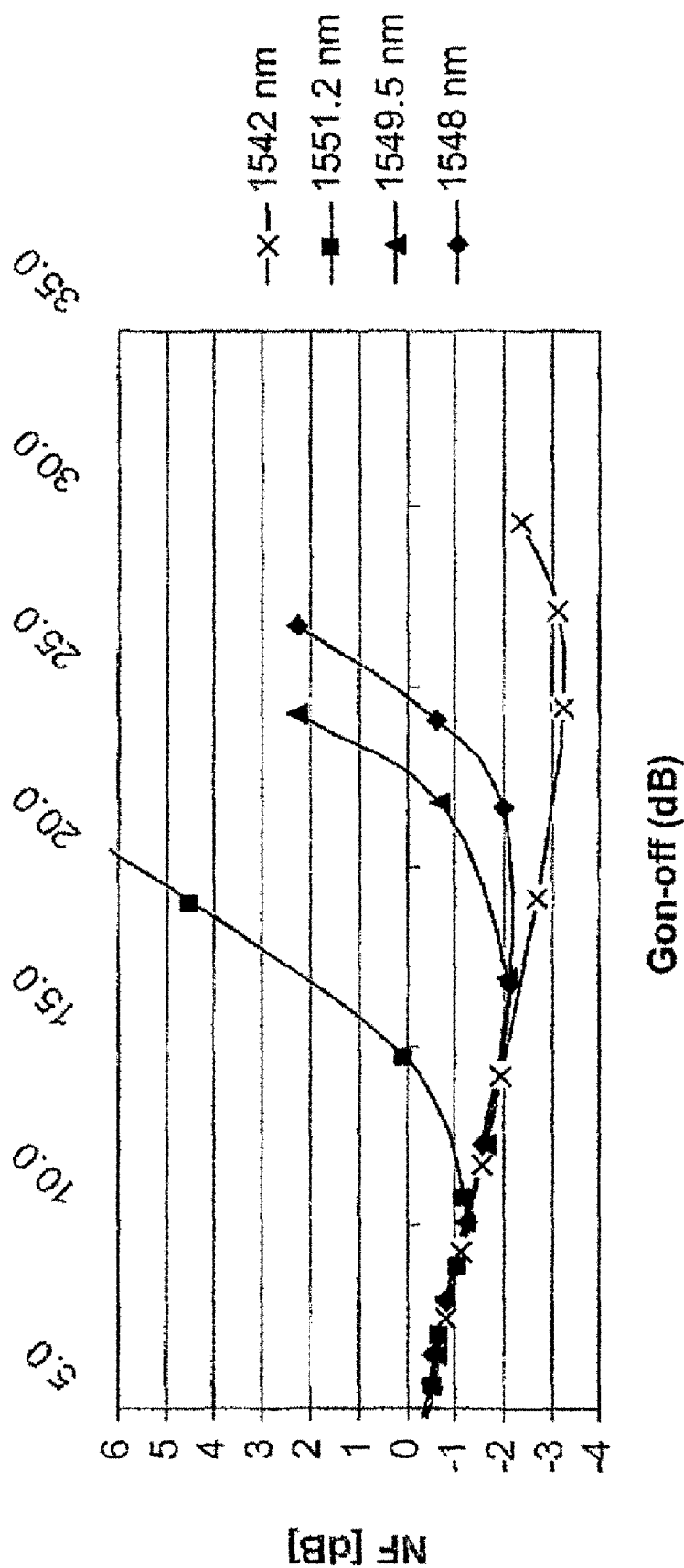
FIG. 9 illustrates the equivalent noise figure in relation to on-off gain ($G_{on\text{-}off}$) approaching resonance conditions.

When resonance is present the effect described in FIG. 8 is greater and the NF begins to rise in relation to pump power (or on-off gain) as soon as the signal begins to approach the maximum resonance wavelength. This is illustrated in FIG. 9, which shows NF as a function of on-off gain ($G_{on-off}$) for signal wavelengths of 1542, 1548, 1549.5 and 1551.2 nm respectively. The rise in NF can be clearly seen as the signal wavelength increases towards resonance at 1550 mm.

In the presence of resonance, double Rayleigh backscattering (DRS) of the signal is also heightened by the transfer of noise from the pump to the single backscattering of the signal through parametric gain. It is however experimentally difficult to measure the DRS power of the resonating signal because this power merges with the excessive increase in ASE+.

It will be seen below how the present invention avoids the accumulation of ASE+ under resonance conditions, and therefore the deterioration in NF, and is also effective in reducing potential penalties due to the signal DRS. It should be noted that an increase in signal DRS inevitably results in deterioration of performance because such DRS must be regarded as cross-talk for the signal.

From an analysis of the spectral emission characteristics of a typical fibre Raman laser it can be deduced that the spectrum of the radiation used as a pump comprises a very high number of longitudinal modes having a very narrow line width hundreds of kHz) and a spacing of the order of MHz. These longitudinal modes are also characterised by strong coherence or, in other words, by a well-defined phase relationship, because of the fact that they are generated from the same laser cavity. This characteristic has the result that nonlinear interaction providing parametric gain for the ASE– photons which are in a resonant condition (that is at symmetrical wavelengths with respect to the dispersion zero and the pump wavelength) is particularly efficient. The inventors have appreciated that by appropriately acting upon the pump radiation emitted from the fibre Raman laser it is possible to suitably de-correlate the longitudinal modes constituting the pump radiation and, as a consequence, appreciably reduce the efficiency of the parametric gain undergone by the resonant ASE– photons. This is directly reflected in a drastic reduction in the accumulation of ASE+ due to the backscattering of ASE– in the resonance spectral zone where WDM channels might be allocated. It therefore follows that the amplifier NF is degraded at high pump powers in a spectrally uniform way only because of backscattering of the ASE– generated by Raman amplification (see FIG. 8) and is not increased under resonance conditions by the parametric gain.

Three possible embodiments of the invention are described below by way of example.

Referring to FIG. 10 there is shown shows a schematic representation of a counter-pumped distributed Raman amplifier arrangement in accordance with a first embodiment of the invention. The arrangement differs from the known arrangement at previously described with reference to FIG. 3 in that the Raman pump module (22) includes a de-correlating (dispersive) element (24) connected to the output of the fibre Raman laser (18). Typically the de-correlating element can comprise a short length of optical fibre (or other component) which introduces appropriate de-correlation of the longitudinal modes of the pump radiation. Such fibre could for example comprise dispersion compensating fibre (DCF) which is used for compensating for chromatic dispersion or standard telecommunications fibre of the G.652 type (SMF). In the experimental arrangement, the performance results which are discussed below the de-correlation element comprises a 2 km length of dispersion compensation fibre (DCF).

In this embodiment it is also advantageous to further include a cascade filter (26) for blocking amplified spontaneous emission generated by the Raman effect within the de-correlating element (24) element comprising a considerable length of a standard or dispersion compensation fibre capable of blocking the spontaneous emission power produced by the Raman effect in the dispersive element.

De-correlating the longitudinal modes of the pump laser using the DCF/SMF fibre (or other kind of fibre) substantially reduces the parametric gain efficiency experienced by the ASE– photons close to resonance during propagation in the transmission fibre (2).

The presence of a suitable de-correlating element before the pump radiation is coupled into the transmission fibre has the result that the products of four-wave-mixing (FWM) generated in the resonance zone at a given frequency by different pairs of longitudinal modes of the laser (parametric amplification is nothing other than a resonant FWM interaction) sum together not in phase but in power. The effect achieved, as will be seen below by comparing the performance of the arrangements of the invention with that of FIG. 3, is the virtual suppression of the spontaneous ASE+ bump under resonance conditions even with very high on-off Raman gain, and as a consequence a virtual elimination of the NF penalty (or deterioration of the SNR leaving the amplifier). The effect of reducing cross-talk due to DRS is also appreciable.

Referring to FIG. 11 there is shown a further counter-pumped distributed Raman amplifier arrangement in accordance with the invention. In this example the de-correlating element comprises two optical couplers (28, 30) and a delay line (32). The optical couplers (28, 30), which can comprise 3 dB optical couplers having a 50:50 splitting ratio, first separate and then recombine the pump radiation. The delay line is provided on one of the two optical paths between the couplers. The length of the delay line (32) is selected to be sufficient to de-correlate longitudinal modes of the pump radiation (the experimental results were obtained using 250 meters of G.653, DSF, fibre).

The effect on pump radiation may be compared with that of the first embodiment (FIG. 10), with the single difference that the phase difference between the modes is now obtained with a greater loss in the pump power (typically between 3 and 4 dB, while in the first embodiment it can be less than 1.5 dB).

Referring now to FIG. 12 there is shown a yet further counter-pumped distributed Raman amplifier arrangement in accordance with the invention. In this embodiment the pump radiation is separated into orthogonal polarisation components by a polarization divider (34), one of the two components is delayed by a delay element (36) (typically an optical fibre of appropriate length, for example 250 meters of DS delay fibre), and then the two polarisation components are recombined by a polarisation combiner (38) before being coupled into transmission fibre in a counter propagating direction with respect to the WDM signals. In this embodiment the loss introduced into the pump is of the order of 1 dB as in the first embodiment.

Analysis and comparison of performance for the three different embodiments described above is now presented. FIG. 13 provides a comparison, for equal Raman gain, between the NF spectral performance close to the resonance condition for the known Raman amplifier arrangement (FIG. 3) and the two embodiments illustrated in FIGS. 10 and 11. It is clear from FIG. 13 that the de-correlating element almost completely eliminates the increase in NF.

This type of comparison is also made in terms of signal-to-noise ratio, as seen in FIG. 14. From FIG. 14 it is observed that the embodiments proposed improve this ratio by approximately 7 dB, virtually eliminating all the deterioration in performance present when there is resonance using a single fibre Raman laser (i.e. a single pump wavelength generated using a fibre Raman laser).

The performance of the arrangements of FIGS. 3 and 10 were then compared using an eight wavelength multiplexed signal as opposed to a single wavelength input signal. FIG. 15 clearly shows how the inclusion of the de-correlating element effectively improves the signal-to-noise ratio in all the channels close to resonance; for an equal output signal power, and therefore Raman gain. The presence of the de-correlating element reduces spontaneous ASE+ emission.

Again for the arrangements in FIGS. 3 and 10, the S/N performance under full resonance were compared in relation to on-off gain (FIG. 16). The presence of the de-correlating element results in an improvement of 10 dB in S/N in the case of maximum Raman gain. It should be noted that in the case of the known arrangement of FIG. 3 the deterioration in S/N which is observed in FIG. 16 is that which is typical of a distributed Raman amplifier pumped in a counter propagating direction, due to backscattering of the ASE– regardless of whether resonance is present (the same phenomenon described in FIG. 8 in terms of deterioration in NF).

FIG. 17 shows a comparison between the DRS (double Rayleigh scattering) characteristics measured for the arrangements in FIGS. 3 and 10 for the same Raman gain. The spectra in this Figure have been obtained by the time domain extinction technique which makes it possible to measure both the spectra for ASE+ and signals and the spectra for ASE+ and double backscattering of the signals using an optical spectrum analyser. The spectra for ASE+ and DRS for the two amplifier arrangements in FIGS. 3 and 10 are shown in FIG. 17. It will be apparent that the inclusion of a de-correlating element (FIG. 10) appreciably reduces not only the accumulation of ASE+ when resonance is present but also the signal DRS. It should be noted that DRS cannot be measured precisely with signals at a wavelength corresponding to resonance, because under these conditions the DRS is so spectrally broadened that it is not possible to distinguish it from the ASE+. However an appreciable improvement in terms of DRS also can be noted in comparison with FIG. 17.

It will be appreciated that the present invention can also be usefully applied to systems which use several sources of pump radiation having different pumping wavelengths in order to broaden the gain band provided by the distributed Raman amplifier. One such arrangement is shown in FIG. 18, in which the use of two pumping laser sources (18a, 18b), one at a pump wavelength $\lambda_{P1}$, the other at a pump wavelength. $\lambda_{P2}$, is shown. Again in this example both the pump laser radiation sources (18a, 18b) are Fibre Raman lasers. The two pump radiation at wavelengths $\lambda_{P1}$ and $\lambda_{P2}$ are combined by a multiplexer (40) and are then fed in a counter propagating direction to the transmission fibre (2) via the circulator (or coupler) (20).

FIG. 19 shows a diagram of the optical communication system in FIG. 18 modified according to this invention by the inclusion of a de-correlating element (42a, 42b) between each source (18a, 18b) of pump laser radiation and the multiplexer (40). The first de-correlating element (42a) provides suitable de-correlation of the longitudinal modes of the pump radiation at wavelength $\lambda_{P1}$ and the second element (42b) provides suitable de-correlation at wavelength $\lambda_{P2}$. Of course the de-correlating elements can be constructed in accordance with any of the embodiments already described.

Although in the embodiments described the pump source has been a fibre Raman laser (which it will be re called is the most critical scenario) the invention can also be useful for preventing deterioration of the signal-to-noise ratio due to resonance phenomena in situations where the pump radiation sources are of other types such as for example polarisation or depolarisation multiplexed Fabri-Perot laser diodes. Furthermore in the embodiments described it is possible to include a device to extract the counter propagating pump laser radiation from the transmission fibre, such as for example using an optical coupler or a circulator, in accordance with ordinary techniques for constructing optical communications systems in the circumstance where it is necessary to extract residual pump radiation at the end of the section.

The invention claimed is:

1. A method of providing counter-pumped Raman amplification in a wavelength division multiplex (WDM) optical communication system that includes a transmission optical fiber for guiding WDM radiation having a transmission waveband and at least one Raman pump laser for generating pump radiation having a respective pump wavelength, the transmission fiber having a zero dispersion wavelength lying midway between the transmission waveband and the pump wavelength, the method comprising the step of: de-correlating longitudinal modes of the pump radiation before coupling the pump radiation into the transmission fiber in a counter propagating direction with respect to the WDM radiation.

2. The method according to claim 1, in which the pump laser is a fiber Raman laser.

3. An optical wavelength division multiplex (WDM) communication system comprising:
   a) a transmission optical fiber for guiding WDM radiation having a transmission waveband;
   b) at least one Raman pump laser for generating pump radiation having a respective pump wavelength;
   c) coupling means for coupling the pump radiation into the transmission optical fiber in a counter propagating direction with respect to a direction of propagation of the WDM radiation;
   d) the transmission fiber having a zero dispersion wavelength lying midway between the transmission waveband and the pump wavelength; and
   e) de-correlating means for de-correlating longitudinal modes of the pump radiation before it is coupled into the transmission fiber.

4. The communication system according to claim 3, in which the pump laser is a fiber Raman laser.

5. The communication system according to claim 3, in which the de-correlating means includes a length of optical fiber having dispersive or non-linear characteristics for de-correlating the longitudinal modes of the pump radiation.

6. The communication system according to claim 5; and further comprising a filter between a length of the fiber and the coupling means, for blocking spontaneous emission produced by the Raman effect in the length of the fiber.

7. The communication system according to claim 3, in which the de-correlating means comprises a first optical coupler for dividing the pump radiation to propagate along first and second optical paths; a delay element included within one of the optical paths; and additional coupling means for re-combining the pump radiation from the first and second optical paths.

8. The communication system according to claim 7, in which the delay element comprises a length of optical fiber whose length is sufficient to de-correlate the longitudinal modes of the pump radiation.

9. The communication system of claim 3, in which the de-correlating means comprises a polarization divider for dividing the pump radiation to propagate along first and second optical paths; a delay element included within one of the optical paths; and a polarization combiner for re-combining the pump radiation from the first and second optical paths.

10. The communications system according to claim 9, in which the delay element comprises a length of optical fiber whose length is sufficient to de-correlate the longitudinal modes of the pump radiation.

11. The communications system according to claim 3; and further comprising a plurality of Raman pump lasers each for generating pump radiation having a respective different pump wavelength; a respective de-correlating means for de-correlating the longitudinal modes of the pump radiation; and multiplexing means for combining the pump radiation.

12. A Raman pump module for generating pump radiation having a pump wavelength for coupling into a transmission fiber of an optical wavelength division multiplex (WDM) communication system to provide Raman amplification of WDM radiation counter propagating therethrough, the WDM radiation having a transmission waveband, the transmission fiber having a zero dispersion wavelength lying midway between the transmission waveband and the pump wavelength, the module comprising:
   a) a Raman pump laser for generating the pump radiation; and
   b) de-correlating means for de-correlating longitudinal modes of the pump radiation before it is coupled into the transmission fiber.

13. The Raman module according to claim 12, in which the pump laser is a fiber Raman laser.

14. The Raman module according to claim 12, in which the de-correlating means includes a length of optical fiber having dispersive or non-linear characteristics for de-correlating the longitudinal modes of the pump radiation.

15. The Raman module according to claim 14; and further comprising a filter for blocking spontaneous emission produced by the Raman effect in the length of fiber.

16. The Raman module according to claim 12, in which the de-correlating means comprises a first optical coupler for dividing the pump radiation to propagate along first and second optical paths; a delay element included within one of the optical paths; and coupling means for re-combining the pump radiation from the first and second optical paths.

17. The Raman module according to claim 16, in which the delay element comprises a length of optical fiber whose length is sufficient to de-correlate the longitudinal modes of the pump radiation.

18. The Raman module according to claim 12, in which the de-correlating means comprises a polarization divider for dividing the pump radiation to propagate along first and second optical paths; a delay element included within one of the optical paths; and a polarization combiner for re-combining the pump radiation from the first and second optical paths.

19. The Raman module according to claim 18, in which the delay element comprises a length of optical fiber whose length is sufficient to de-correlate the longitudinal modes of the pump radiation.

* * * * *